United States Patent [19]

Cho et al.

[11] Patent Number: 5,607,329
[45] Date of Patent: Mar. 4, 1997

[54] INTEGRATED MOTOR/MARINE PROPULSOR WITH PERMANENT MAGNET BLADES

[75] Inventors: Chahee P. Cho, Portsmouth, R.I.; Ralph A. Bedingfield, Nashville, Tenn.; William P. Krol, Jr.; James S. Uhlman, Jr., both of Portsmouth, R.I.

[73] Assignee: The United States of America as represented by the Secretary of the Navy, Washington, D.C.

[21] Appl. No.: 591,187

[22] Filed: Dec. 21, 1995

[51] Int. Cl.[6] .................................................. F04D 25/06
[52] U.S. Cl. .......................... 440/6; 310/67 R; 310/266; 417/356
[58] Field of Search ................................. 440/6, 38, 47; 114/337, 338; 310/67 R, 112, 87, 266; 417/353, 352, 356, 410.1, 423.1, 423.3, 423.7, 420

[56] References Cited

U.S. PATENT DOCUMENTS

| 286,534 | 10/1883 | Dey et al. ............................. 114/151 |
| 4,563,622 | 1/1986 | Deavers et al. ....................... 318/254 |
| 4,758,132 | 7/1988 | Hartwig ............................. 310/67 R |
| 4,831,297 | 5/1989 | Taylor et al. ............................ 310/87 |
| 4,953,811 | 9/1990 | Smith ................................... 417/356 |
| 5,220,231 | 6/1993 | Veronesi et al. ........................ 310/90 |

Primary Examiner—Edwin L. Swinehart
Attorney, Agent, or Firm—Michael J. McGowan; Michael F. Oglo; Prithvi C. Lall

[57] ABSTRACT

An integrated motor/marine propulsor is provided having an electric motor adapted for converting electrical energy into hydropropulsive energy. The electric motor comprises at least one stator assembly disposed in magnetomotive relation to a rotor. The rotor of the present invention advantageously includes a plurality of rotor blades wherein a portion of at least one of the rotor blades comprises a permanent magnet.

17 Claims, 7 Drawing Sheets

INTEGRATED MOTOR/MARINE PROPULSOR WITH PERMANENT MAGNET BLADES

STATEMENT OF GOVERNMENT INTEREST

The invention described herein may be manufactured and used by or for the Government of the United States of America for governmental purposes without the payment of royalties thereon or therefor.

BACKGROUND OF THE INVENTION

1. Field of the Invention

The present invention generally relates to electric propulsion systems for marine vehicles, and more particularly to propulsor units used in connection with such electric propulsion systems.

2. Description of the Prior Art

Electric propulsion systems for use with both surface and submersible marine vehicles are well known in the art. For example, U.S. Pat. Nos. 4,831,297; 4,927,329; 5,078,628; 5,220,231; 5,252,875; and 5,289,068, all teach various types of electric propulsion systems adapted for use on such marine vehicles, which patents are hereby incorporated herein by reference.

These and other prior art electric propulsion systems typically consist of an energy source, an energy conversion system, and a propulsor unit. The energy source may be a nuclear power plant, an internal combustion engine, or even a battery. In the case where a nuclear power plant or internal combustion engine is employed, the output energy must be converted to electrical energy. Typically, this conversion is accomplished by mechanically coupling the output of the energy source to an ac or dc generator so as to produce an electric current that is adapted to power the propulsor unit.

In order to achieve a high propulsive efficiency—within specified noise and vibration criteria—a highly loaded, diameter-constrained propulsor unit is often employed. These prior art propulsor units typically comprise a conventional electric motor that is adapted to drive a propeller system. As a result of the noise and vibration criteria, these prior art propulsor units are designed to operate at relatively low rotational speeds. As a consequence, the propulsor unit must provide a very high output torque in order to achieve a high propulsive efficiency. Unfortunately, many of the prior art electric motor and propeller systems fail to provide the necessary level of output torque.

Often, the diameter of the propulsor unit may be constrained as a result of the severe dimensional restrictions dictated by the marine vehicle itself. In particular, the diameter of the propulsor unit is often limited by the hull dimensions of the vessel. The restricted diameter of the propulsor unit also tends to reduce the propulsive efficiency in prior art electric propulsion systems. In particular, the efficiency of prior art electric motor propulsor units often drops off dramatically at speeds lower than the "design" speed.

A further problem associated with prior art propulsion systems is the production of waste heat. In many cases, a substantial cooling system may be required to remove the excess heat that is produced by the energy source, the energy conversion system, and the propulsor unit. A typical cooling system may include a circulation pump, a heat exchanger, and associated piping. Such cooling systems not only occupy already limited space within the vessel, but also require energy to be diverted from the propulsion system to run the circulation pump. This problem is particularly troublesome when it arises in high performance motors of the type typically used in connection with driving torpedoes and the like. Such motors are often designed for optimum performance over a relatively brief period of time, e.g., 3–5 minutes. The additional weight and complexity associated with the inclusion of a typical cooling system in this type of marine vehicle is a significant disadvantage in the prior art.

Consequently, a need exists for an integrated motor/marine propulsor system which will eliminate the above-described problems associated with conventional electric propulsion systems while, at the same time, providing higher efficiency, power density, and output torque.

SUMMARY OF THE INVENTION

It is, therefore, an object of the invention to provide an integrated motor/marine propulsor having a higher theoretical efficiency and power density with all the aforementioned needs substantially met.

Another object of the invention is to provide a integrated motor/marine propulsor having a higher torque output and a greater propulsor diameter.

Yet another object of the invention is to provide an integrated motor/marine propulsor having better off-design performance.

And another object of the invention is to provide an integrated motor/marine propulsor system that requires no auxiliary cooling system.

A further object of the invention is to provide an integrated motor/marine propulsor having a propeller system wherein a portion of at least one propeller blade comprises a permanent magnet.

A still further object of the invention is to provide an integrated motor/marine propulsor having fewer system components so as to reduce the volume, weight, longitudinal extent, and production costs as compared to known marine propulsors.

With the above and other objects in view, as will hereinafter appear, a feature of the present invention is the provision of a marine propulsor comprising electric motor means for converting electrical energy into hydropropulsive energy wherein the electric motor means comprise at least one stator disposed in magnetomotive relation to a motor. The rotor of the present invention includes a plurality of rotor blades wherein a portion of at least one of the rotor blades comprises a permanent magnet. Means are provided for connecting the electric motor means to a source of electrical power and for structurally supporting the electric motor means on a marine vehicle.

In one preferred embodiment of the present invention, a marine propulsor comprises an annular shroud comprising a water inlet end, a water outlet end, and an inner surface having an annular recess disposed adjacent to the water inlet end. The electric motor means include a first annular stator that is disposed within the annular recess of the annular shroud. The first stator includes a plurality of windings and an annular stator core. A second annular stator is disposed in spaced-away, coaxial confronting relation to the first annular stator. The second annular stator also includes a plurality of windings and an annular stator core. A rotor, comprising a plurality of permanent magnet propulsion blades projecting radially outward from a central annular hub to an annular rotor band, is disposed in coaxial relation to the shroud, between the first annular stator and the second annular stator. As a result of this construction, the annular rotor band is positioned in sealed circumscribed relation to the first annular stator and the central annular hub is disposed in surrounding sealed relation to the second annular stator. In this arrangement, the rotor is entirely free to rotate relative to the first and second stators.

Means for structurally supporting the marine propulsor may include a rigid support structure having an end portion centrally disposed within the water inlet end of the annular shroud. The support structure is rigidly attached to the annular shroud by a plurality of support blades extending generally radially inward from the inner surface of the shroud to an outer surface of the end portion. The support structure also includes an axial portion that is rigidly attached to the end portion, and extends therefrom axially through the central annular hub of the rotor. The second annular stator may be mounted to the axial portion so that the central annular hub sealingly encloses the second annular stator, and rotates relative to the first and the second annular stators and the axial portion.

Means for connecting the electric motor means to a source of electric power may include electrical power cables that are connected to the stator windings in the first and second annular stators. The cables extend from the stators, through the interior of at least one of the support blades of the end portion, and therefrom through the interior of the axial portion of the support structure to the exterior of the propulsion unit for connection to the source of electrical power.

The above and other features of the invention, including various novel details of construction and combinations of parts, will now be more particularly described with reference to the accompanying drawings and pointed out in the claims. It will be understood that the particular devices embodying the invention are shown by way of illustration only, and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 1:
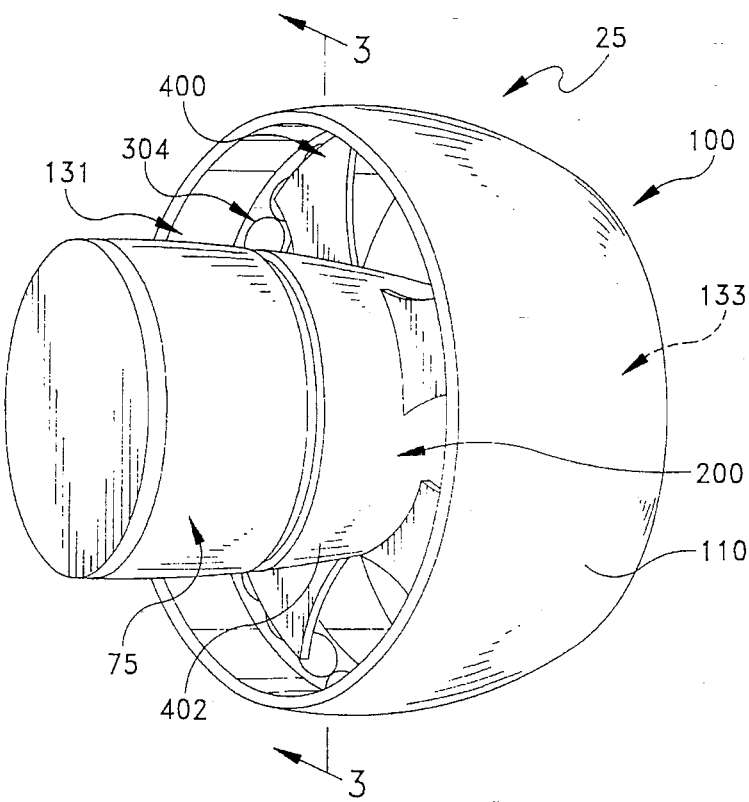
FIG. 1 is a perspective view of an integrated motor/marine propulsor formed in accordance with the present invention.
Figure 2:
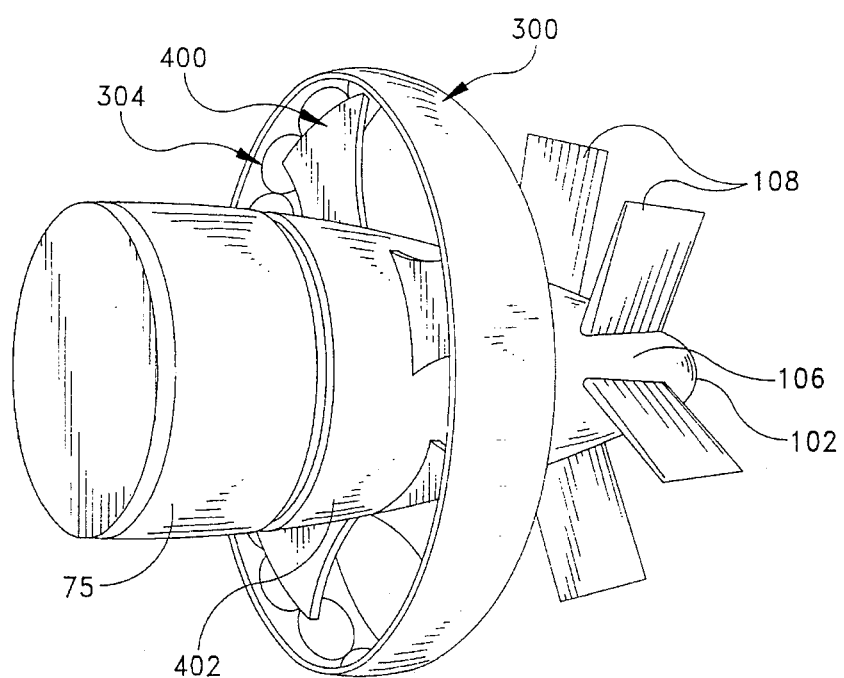
FIG. 2 is a perspective view, similar to FIG. 1, but with the annular shroud removed so as to reveal a portion of the outer stator assembly, a portion of the rotor blades, and a portion of the stator blades.
Figure 8:
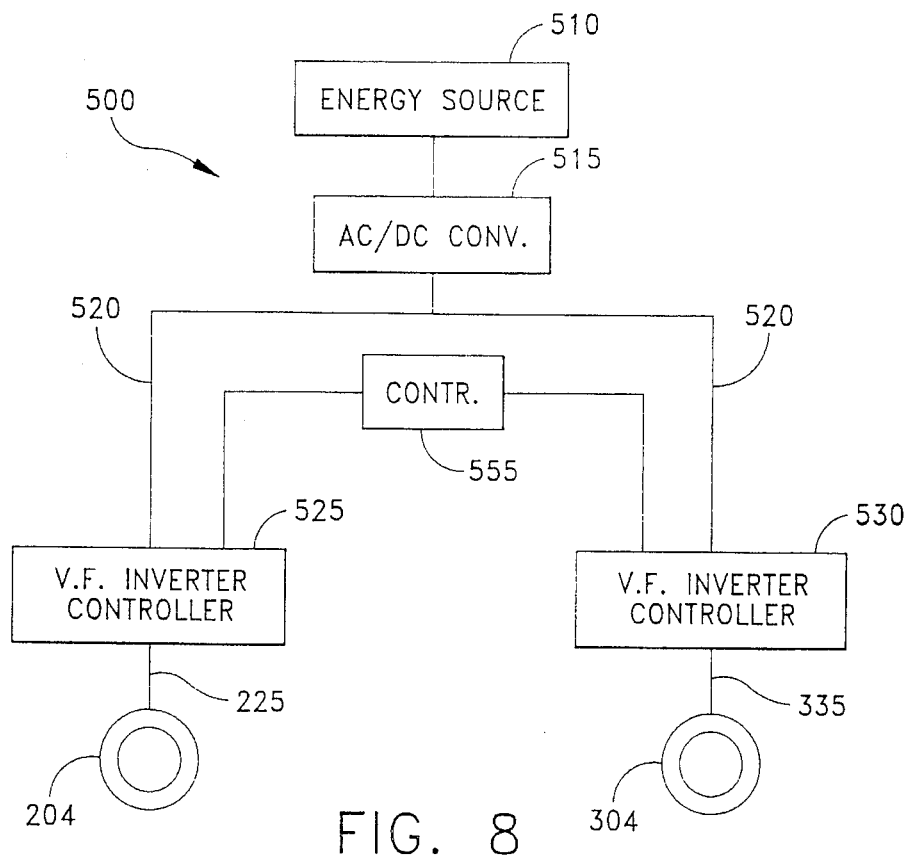
FIG. 8 is a block schematic diagram of a typical electrical power and conversion system used in connection with the present invention.
Figure 9:
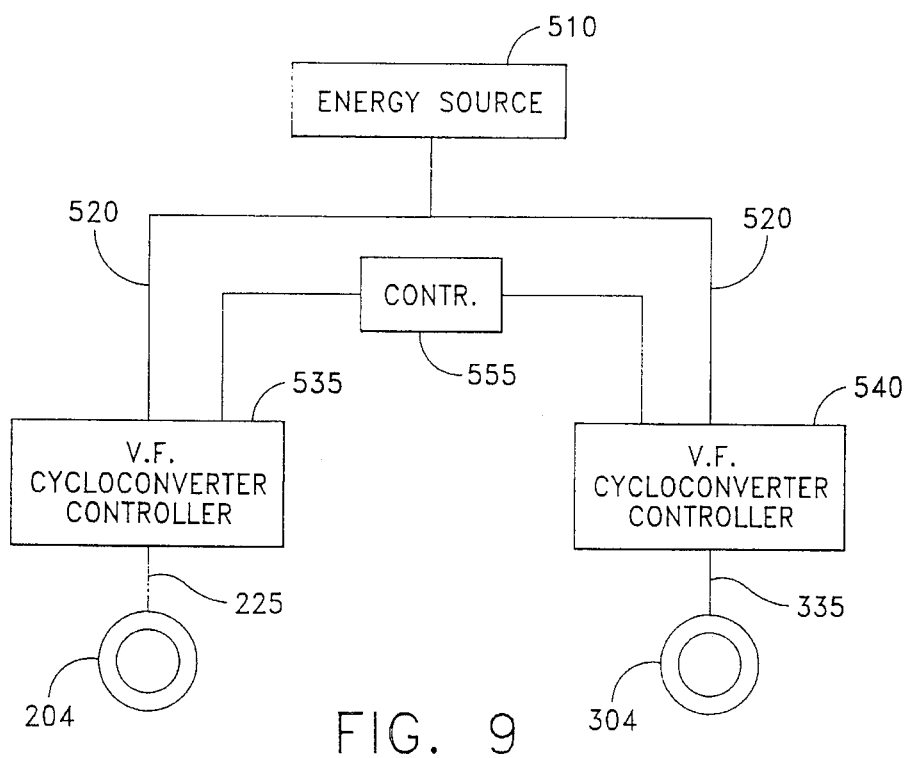
FIG. 9 is a block schematic diagram of an alternative electrical power and conversion system used in connection with the present invention.

Referring to FIGS. 1 and 2, it will be seen that an illustrative integrated motor/marine propulsor unit 25, formed in accordance with one preferred embodiment of the present invention, comprises an outer flow assembly 100, an inner stator assembly 200, an outer stator assembly 300 (FIG. 2), a rotor assembly 400, and an energy source and electrical conversion system 500 (FIGS. 8 and 9).

Figure 3:
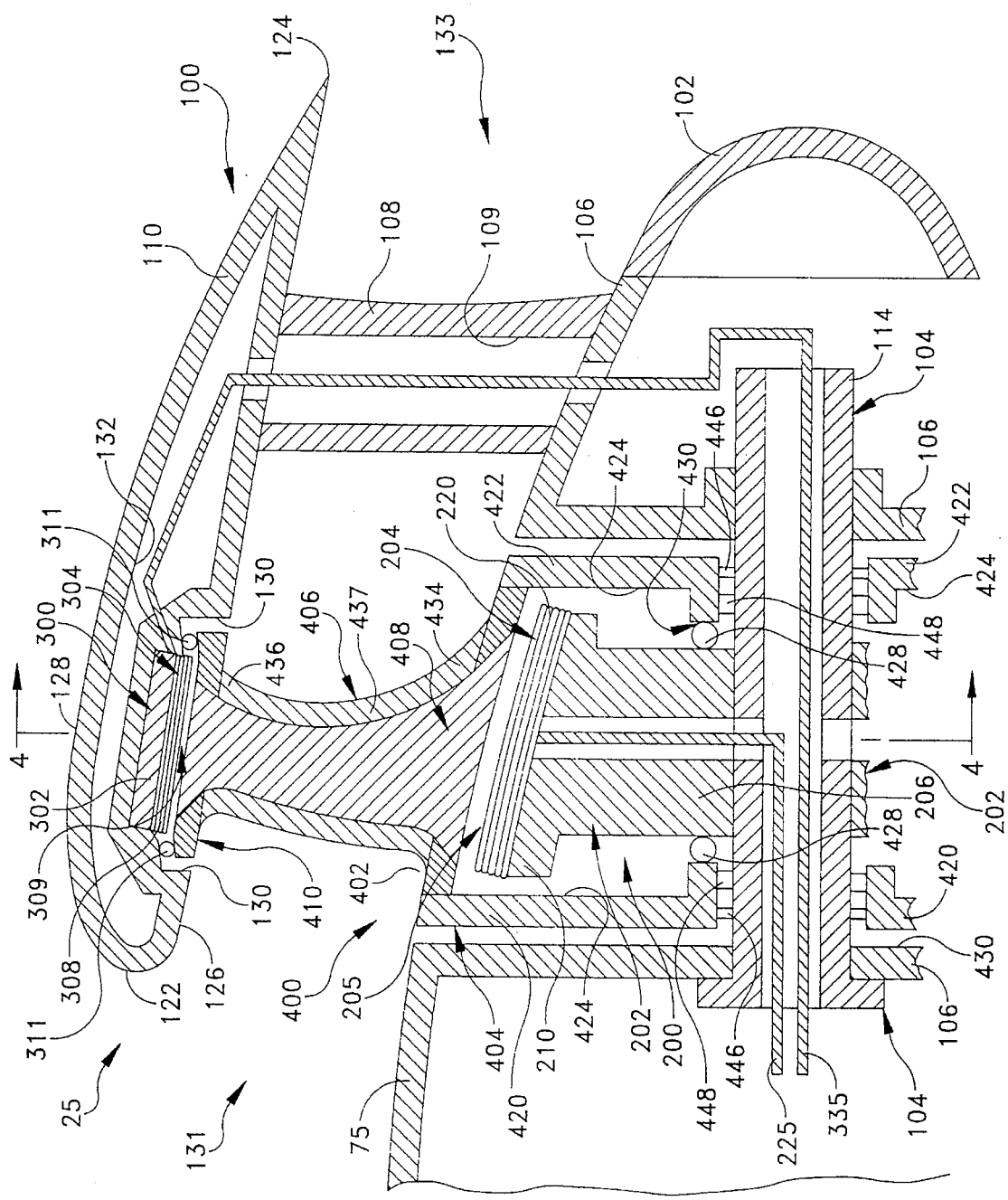
FIG. 3 is a partially broken-away cross-sectional view of the integrated motor/marine propulsor, as taken along line 3—3 in FIG. 1.

More particularly, and now referring to FIGS. 1–3, outer flow assembly 100 is typically positioned on the tail section or stern frame 75 of the generally cylindrically-shaped body of a marine vehicle (not shown). Outer flow assembly 100 comprises an axle 104 (FIG. 3), a propulsor stator hub 106, a plurality of propulsor stator blades 108, and a duct 110. A hollow fairwater 102 is disposed over axle 104 so as to prevent the ingress of water into the stern of the marine vehicle. Fairwater 102 typically comprises a hydrodynamically efficient tail cone shape. Axle 104 comprises a hollow non-rotating cylinder that projects outwardly from the stern of the marine vehicle. The distal end 114 of axle 104 is disposed within a portion of the interior of fairwater 102 and propulsor stator hub 106. Axle 104 is sized and shaped so as to support propulsor unit 25 on the stern of the marine vehicle, and to provide a conduit for electrical cables or the like.

Propulsor stator hub 106 comprises a hollow frusto-conical shroud that is positioned just forward of fairwater 102. Stator hub 106 is disposed in sealed surrounding-relation to distal end 114 of axle 104. A plurality of propulsor stator blades 108 project radially outward, in circumferential relation, to stator hub 106. Stator blades 108 extend between stator hub 106 and a rear inner portion of duct 110. Stator blades 108 are sized and shaped so as to redirect fluid flow from rotor assembly 400. Stator blades 108 also act to support various propulsor components. At least one stator blade 108 is hollow (FIG. 3) so as to provide a conduit 109 for electrical cables to pass from distal end 114 of axle 104 into duct 110.

Referring now to FIG. 3, duct 110 comprises an annular, streamlined shroud disposed in surrounding relation to rotor assembly 400 and stator hub 106. Duct 110 comprises a forward annular leading edge 122, a rearward annular trailing edge 124, an inner surface 126, an outer surface 128, a forward annular recess 130, and an interior compartment 132. Leading edge 122 defines an annular water intake opening 131 into which water is drawn by rotor assembly 400 during operation of propulsor unit 25. Likewise, trailing edge 124 defines an annular water output opening 133 from which water is forced out so as to provide hydropropulsive thrust to propel the marine vehicle. Advantageously, as water is drawn through duct 110, heat generated by inner stator assembly 200 and outer stator assembly 300 is transferred to the flowing water thereby reducing the need for an auxiliary cooling system. Duct 110 is supported along a rear portion of inner surface 126 by stator blades 108. Forward recess 130 is annularly disposed within inner surface 126 of duct 110, and is adapted to accept and support outer stator assembly 300, as will hereinafter be disclosed in further detail.

Figure 4:
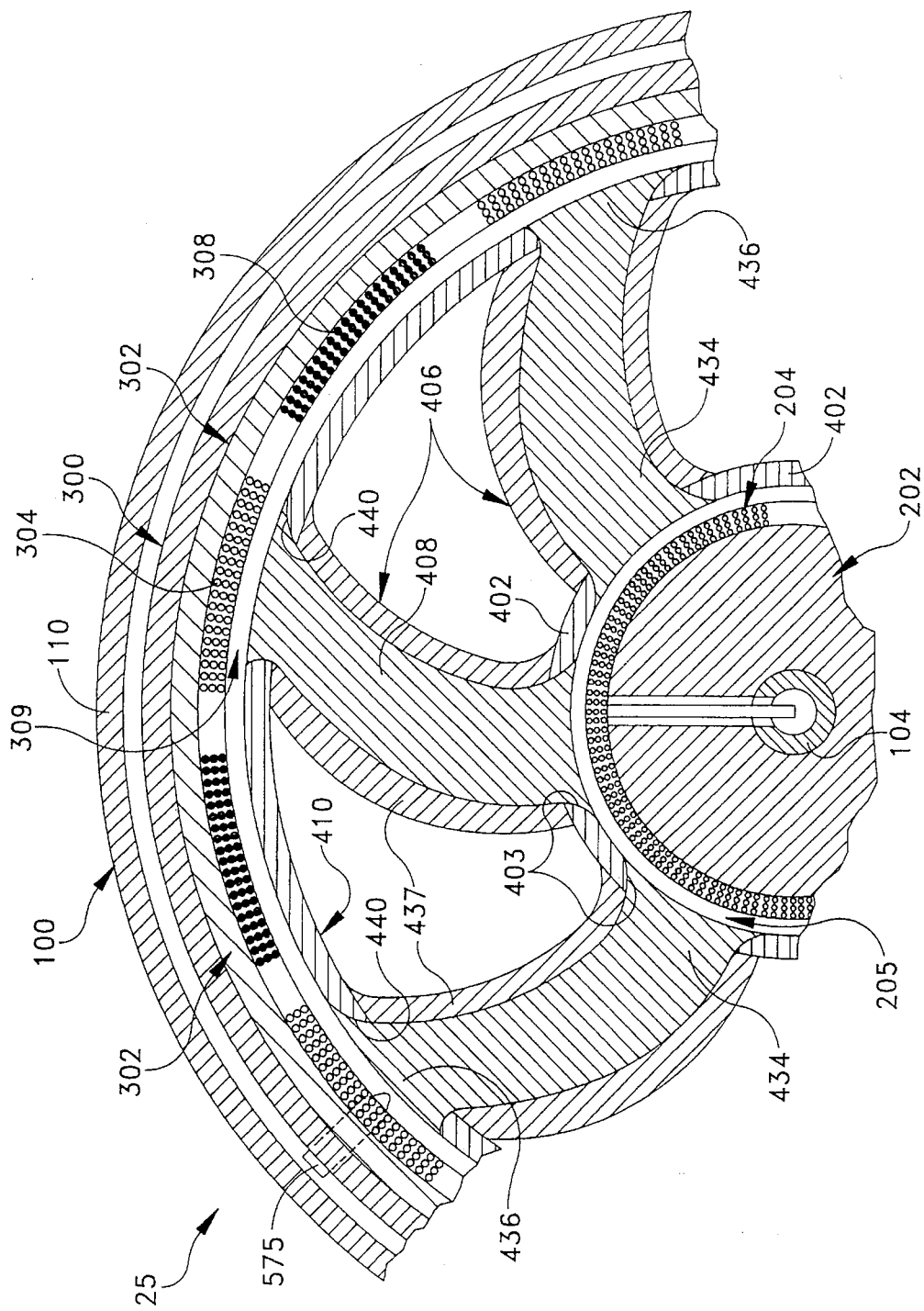
FIG. 4 is a partially broken-away cross-sectional view of the integrated motor/marine propulsor, as taken along lines 4—4 in FIG. 3.
Figure 7:
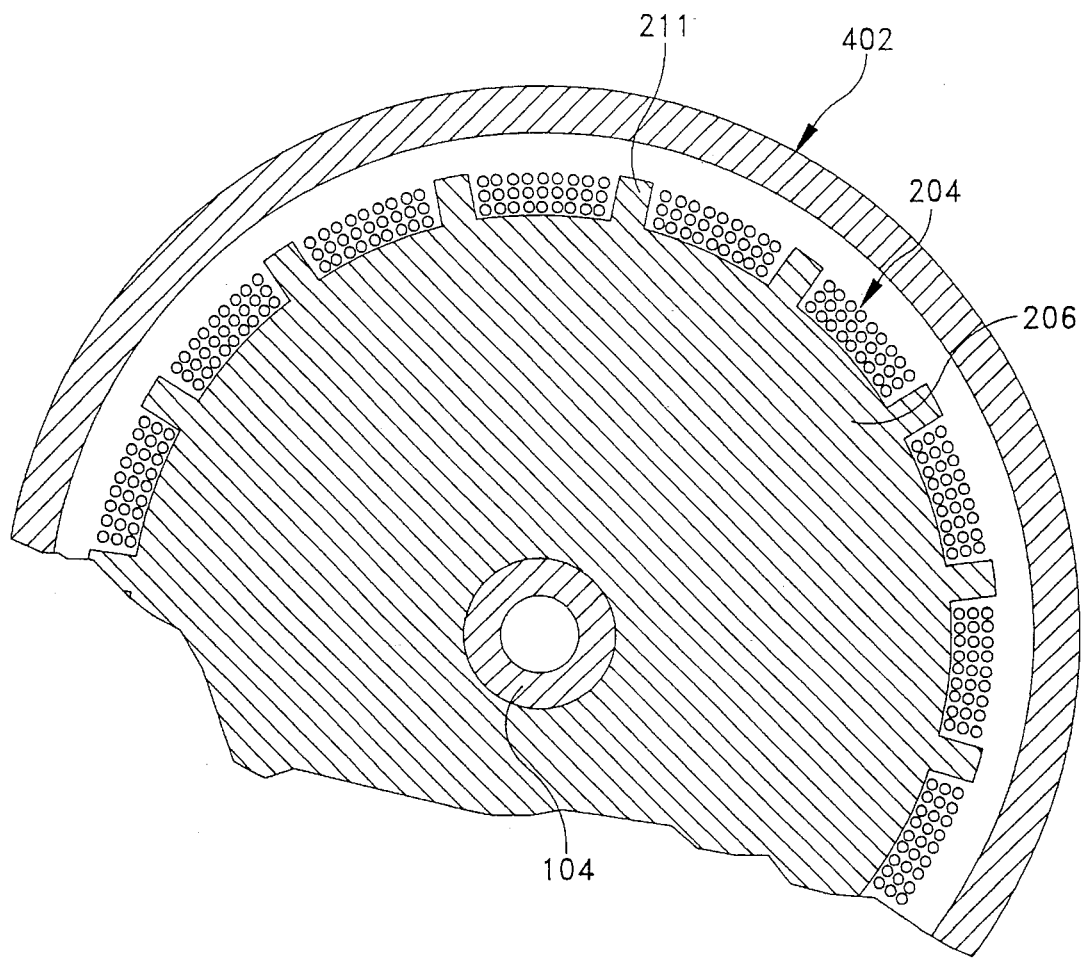
FIG. 7 is a transverse cross-sectional view of a rotor assembly formed in accordance with the present invention with a slotted inner stator assembly.

Referring now to FIGS. 3 and 4, inner stator assembly 200 comprises inner back iron 202 and windings 204. More particularly, inner back iron 202 comprises a ferromagnetic stator core material of the type well known in the art for use in conventional electromagnetic motors and machines to complete the magnetic flux path between the stator and the rotor. Back iron 202 projects radially outward from axle 104, and comprises a base portion 206 and a winding support portion 210. Winding support portion 210 is disposed at a predetermined angle relative to base 206 so as to present an appropriately directed magnetic field to rotor assembly 400, when windings 204 are energized. Winding support portion 210 may comprise either a slotted or slotless configuration. In a preferred embodiment, winding support portion 210 comprises a slotless configuration, as shown in FIGS. 3 and 4. It will be appreciated that a slotless winding support portion 210 reduces cogging between rotor assembly 400 and stators 200 and 300. Of course, a slotted support portion 211 (FIG. 7) may also be used in connection with the present invention.

Windings 204 form a series of coiled conductors 220, and are fastened to support portion 210 by, e.g., epoxy or the like. Conductors 220 are arranged on support portion 210 so as to cause a current running through them to be disposed in substantially perpendicular relation to a magnetic field created by permanent magnets located within at least a portion of the blades of rotor assembly 400, as will hereinafter be disclosed in further detail. An air gap 205 separates windings 204 from rotor assembly 400. This arrangement of windings 204 is adapted to maximize the magnetomotive force exerted on the blades of rotor assembly 400. As will be appreciated by those skilled in the art, the current passing through individual conductors 220 of windings 204 is regulated, via electrical conversion system 500, so as to maximize the net torque induced by conductors 220 on all permanent magnets, for all angular displacements of rotor assembly 400. Windings 204 are interconnected to energy source and electrical conversion system 500 via a first multiconductor cable 225, and may be adapted for either single phase or multiphase operation.

Referring still to FIGS. 2–4, outer stator assembly 300 comprises an outer back iron 302 and windings 304. More particularly, outer back iron 302 comprises a continuous annular element that is disposed within forward annular recess 130 of duct 110. Outer back iron 302 is also formed from a ferromagnetic stator core material of the type well known in the art for use in conventional electromagnetic motors and machines to complete the magnetic flux path between the stator and the rotor.

Outer windings 304 also form a series of coiled conductors 308, and are fastened to outer back iron 302 by, e.g., epoxy or the like. Conductors 308 are arranged on back iron 302 so as to cause a current running through them to be disposed in substantially perpendicular relation to a magnetic field created by the permanent magnets located within at least a portion of the blades of rotor assembly 400. An "air gap" 309 separates windings 304 from rotor assembly 400. This arrangement of conductors 308 is adapted to maximize the magnetomotive force exerted on the blades of rotor assembly 400. As will be appreciated by those skilled in the art, the current passing through individual conductors 308 of windings 304 is regulated, via electrical conversion system 500, so as to maximize the net torque induced by conductors 308 on all permanent magnets, for all angular displacements of rotor assembly 400. Windings 304 are interconnected to energy source and electrical conversion system 500 via a second multiconductor cable 335, and may be adapted for either single phase or multiphase operation.

Referring now to FIGS. 1–7, rotor assembly 400 comprises a rotor hub 402, an end cap 404, rotor blades 406, permanent magnetic material 408, and a rotor band 410. It will be appreciated that rotor assembly 400 is disposed in coaxial surrounding-relation to inner stator assembly 200, within duct 110, and comprises the only portion of propulsor unit 25 that is free to rotate. Rotor hub 402 comprises a frusto-conical housing that surrounds and encloses inner stator assembly 200. Rotor hub 402 is preferably formed from nonmagnetic material, and is adapted to support rotor blades 406. In particular, rotor hub 402 comprises a series of circumferentially disposed channels 403 (FIG. 4) that are adapted to receive a correspondingly shaped root portion of a rotor blade 406 so as to maintain the magnetic field generated by each rotor blade 406 in substantially perpendicular relation to windings 204 of inner stator assembly 200.

End cap 404 projects downwardly from rotor hub 402, and comprises an annular front wall 420 and an annular rear wall 422. By this arrangement, front wall 420 and rear wall 422 are positioned so as to be in surrounding relation to inner stator assembly 200, when rotor assembly 400 is disposed in its fully assembled position, around axle 104. End cap 404 is preferably formed from nonmagnetic material, and provides structural rigidity and strength to rotor hub 402. A cavity 424 is defined by the void space between inner stator assembly 200, rotor hub 402, and end cap 404. Cavity 424 is typically filled with a non-conducting fluid, such as air, oil, etc. It will be appreciated that this nonconducting fluid will also reside within "air gap" 205. The nonconducting fluid is maintained within cavity 424 by carbon face seals 428 that are disposed along the interface portions 430 of end cap 404. As the working fluid (either fresh or salt water) is substantially nonconductive, in an alternative embodiment of the invention, these seals may be eliminated. The "airgap" would then be filled with either fresh or salt water as the working fluid.

Figure 5:
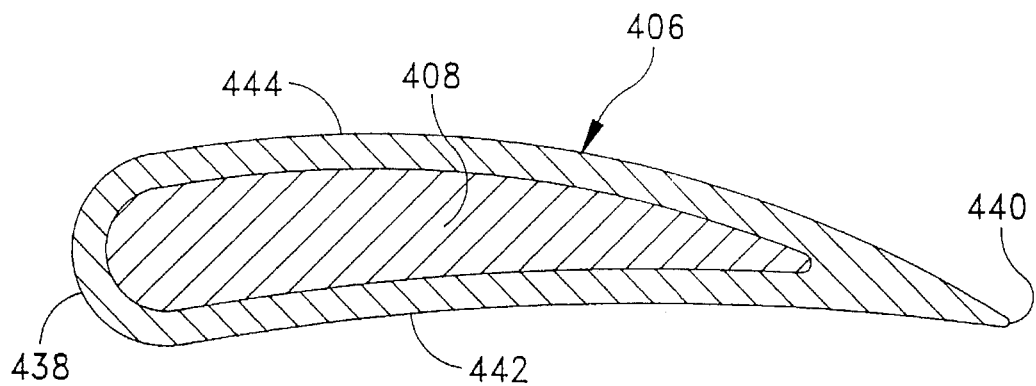
FIG. 5 is a transverse cross-sectional view, as taken through central portion 437 of FIG. 3, of one embodiment of rotor blade used in connection with the present invention.
Figure 6:
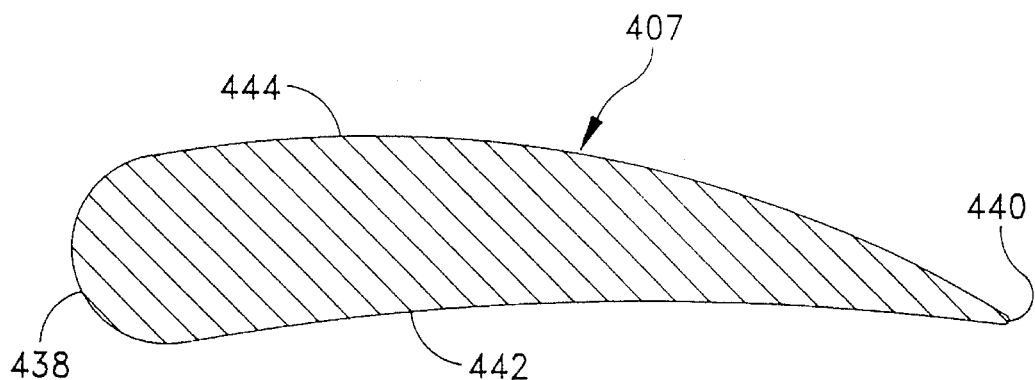
FIG. 6 is a transverse cross-sectional view, as taken through central portion 437 of FIG. 3, of another embodiment of rotor blade used in connection with present invention.

Referring now to FIGS. 3–6, rotor blades 406 comprise a root portion 434, a tip portion 436 and a central portion 437 disposed therebetween. Rotor blades 406 project radially outward from rotor hub 402. Root portion 434 of each rotor blade 406 is fixed within channel 403 of rotor hub 402 so as to be held in position relative to inner stator assembly 200. Channels 403 are sized and shaped so as to place root portion 434 substantially adjacent to air gap 205. Referring now to FIGS. 5 and 6, central portion 437 of each rotor blade 406 forms a propeller blade comprising a leading edge 438, a trailing edge 440, a pressure side 442 and a suction side 444. In a preferred embodiment, rotor blades 406 comprise a hollow nonmagnetic material, that is filled with permanent magnetic material 408. Permanent magnetic material 408 may be any of the permanent magnet materials well known in the art for use in conventional electromagnetic motors and machines, e.g., NbBFe or the like. Permanent magnetic material 408 is typically disposed within hollow rotor blade 406 so as to position one pole of its magnetic field adjacent to rotor blade root portion 434 and the other pole adjacent to rotor blade tip portion 436. In one preferred embodiment of the present invention (FIG. 4), permanent magnetic material 408 comprises a uniform, solid mass disposed within rotor blade 406. Of course, it will be understood that multiple permanent magnets within hollow rotor blade 406, or a completely solid magnetic rotor blade 407 (FIG. 6) may also be used in connection with the present invention.

Referring once again to FIGS. 3 and 4, rotor band 410 comprises an annular ring of nonmagnetic material that circumscribes each tip portion 436 of each rotor blade 406. Rotor band 410 is positioned, within propulsor unit 25, in confronting relation to outer stator assembly 300, with "air gap" 309 disposed therebetween. It will be appreciated that "air gap" 309 is typically filled with a nonconducting fluid, such as air, oil, etc. The nonconducting fluid is maintained within "air gap" 309 by seals 311. As the working fluid (either fresh or salt water) is substantially nonconductive, in an alternative embodiment of the invention, these seals may be eliminated. The "airgap" would then be filled with either fresh or salt water as the working fluid. Channels 441 are formed on the inner surface of rotor band 410, and are sized and shaped to receive a corresponding feature on tip portion 436 so as to fix each rotor blade in position relative to outer stator assembly 300. Rotor band 410 also enhances the structural strength and rigidity of rotor assembly 400, and improves fluid flow along inner surface 126 of duct 110.

In order to facilitate efficient functioning of propulsion unit 25, roller bearings 446 and thrust bearings 448 are disposed between rotor assembly 400 and axle 104. More particularly, thrust bearings 448 are disposed between propulsor unit 25 and the stern of the marine vehicle so as to transfer the hydropropulsive thrust developed by the rotation of rotor blades 406. Roller bearings 446 are disposed between end cap 404 and axle 104 so as to provide for efficient rotation of rotor assembly 400 under the influence of the time varying magnetic fields generated by stator assemblies 200 and 300.

Referring now to FIG. 8, one preferred embodiment of energy source and electrical conversion system 500 is illustrated in general block form, and comprises many of the well known features disclosed in U.S. Pat. No. 5,078,628, issued to Garis, which patent has been hereinabove incorporated by reference. More particularly, energy source 510 may be any conventional power generator, e.g., fossil fuel, nuclear, etc. In one embodiment, the system may include an ac-to-dc converter system 515 that is adapted to provide dc power, via dc bus 520, to variable frequency (v.f.) inverter controllers 525 and 530. The v.f. inverter controllers invert power supplied on dc bus 520 to ac power at a desired frequency. Two v.f. inverter controllers may be provided to supply ac power individually to inner stator assembly 200 and outer stator assembly 300. It will be understood that stator current excitation waveforms may include sinusoidal, trapezoidal, or any other waveform that may be necessary to achieve optimal efficiency and high torque output.

Alternatively, as shown in FIG. 9, ac-to-dc converter system 515 may be eliminated by utilizing v.f. cycloconverters 535 and 540 that directly convert the ac power to the desired frequency. Power is supplied to stator windings 204 and 304 through waterproof cables and connectors, shown generally at 225 and 335 (FIGS. 3, 8, and 9). A conventional controller 555 (e.g., a programmable computer) may be utilized to operate v.f. controllers 525 and 530, or v.f. cycloconverters 535 and 540, to vary allocation of power between stator assemblies 200 and 300. It will be understood that the speed of rotor assembly 400 will be proportional to the frequency of power supplied to stator assemblies 200 and 300.

It will be appreciated by those skilled in the art that the initial position of each rotor blade 406, relative to stator assemblies 200 and 300, is preferably determined prior to operation of propulsor unit 25, or undesirable slippage of rotor assembly 400 may occur. Various well known sensors, such as Hall effect, optical position, encoding and resolver sensors, or the like may be utilized for this purpose. In one embodiment of the invention, seen in FIG. 4, at least one Hall effect sensor 575 is positioned on back iron 302 so as to be disposed in perpendicular relation thereto. In this arrangement, sensor 575 projects radially inward toward tip portion 436 of rotor blade 406. In this way, sensor 575 is positioned, in part, in air gap 309 so as to detect the relative position of each tip portion 436. Of course, sensor 575 could also be positioned on back iron 202 of inner stator assembly 200 with equivalent effect. Sensor 575 is interconnected to controller 555 so as to provide the position of each blade, relative to stator assemblies 200 and 300, at the start of operation of propulsor unit 25. In another embodiment of the invention, an encoder and resolver may be positioned within end cap 404 and inner stator 300, respectively, so as to provide rotor blade positional data to controller 555 by means well known in the art.

Utilization of separate power inputs for inner stator assembly 200 and outer stator assembly 300 provide a unique advantage in controlling the electromagnetic forces on rotor blades 406. Stator assemblies 200 and 300 are mounted on opposite sides of rotor assembly 400, as shown in FIGS. 2–4. Alternating current in the stator windings will set up a rotating magnetic field that will react with the magnetic field created by permanent magnet material 408, disposed within rotor blades 406, to produce a high output torque and a resultant hydropropulsive force. An advantage of the v.f. controller is that the motor speed can be increased slowly from zero cycles/second to a desired operating speed while maintaining synchronization between the rotor speed and the speed of the rotating magnetic fields in both stator assemblies, thus preventing slip and maximizing torque.

It will be understood that the foregoing is merely illustrative of the principles of this invention, and that various modifications can be made by those skilled in the art without departing from the scope and spirit of the invention. For example, a dual air gap configuration, as shown in FIGS. 3 and 4, maximizes the magnetic field provided by the rotor blade permanent magnet and the stator winding excitations. However, trade-offs between efficiency, production costs, weight, ease of maintenance, as well as other considerations may dictate a single air gap construction. It should be understood, therefore, that propulsor unit 25 may comprise only one stator assembly disposed either within duct 110 or on axle 104.

Also, it is preferred to arrange the magnetized blades in pairs so as to match the number of north and south poles. However, asymmetries in the wake of the propulsor unit often require that the total number of blades be odd so as to reduce induced hydrodynamic vibrations. This may be accomplished by not magnetizing every rotor blade. In this embodiment, an odd number of nonmagnetized blades may be arranged symmetrically so as to reduce variations in output torque. It will be understood that the stator current excitation waveform may also be modified so as to achieve a similar result.

Figure 10:
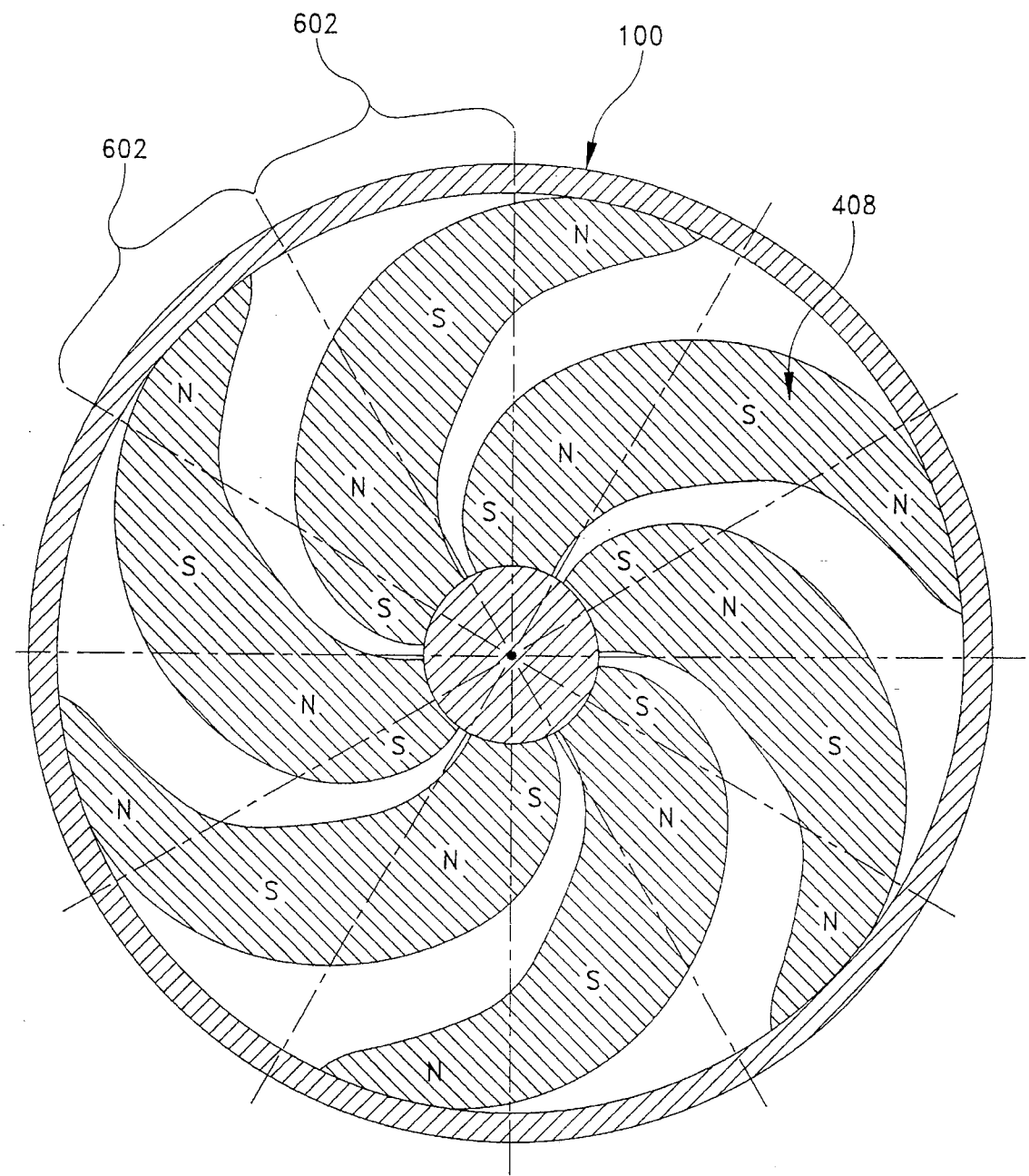
FIG. 10 is a transverse cross-sectional view of a highly skewed arrangement of permanent magnet rotor blades.

Referring now to FIG. 10, rotor blades 409 may be sufficiently skewed so that the effective poles are best represented as zones or sectors 602 of the rotor assembly. Consequently, a given zone of rotor assembly 400 may be assigned a single polarization (i.e., north (N) or south (S)). It should be understood that each individual rotor blade may in fact comprise more than two poles.

It is also to be understood that the present invention is by no means limited to the particular constructions herein disclosed and shown in the drawings, but also comprises any modifications or equivalents within the scope of the claims.

What is claimed is:

1. A marine propulsor comprising:

electric motor means for converting electrical energy into hydropropulsive energy wherein said electric motor means comprise:

an annular shroud comprising a water inlet end, a water outlet end, and an inner surface having an annular recess disposed adjacent to said water inlet end;

a first annular stator assembly disposed within said annular recess of said annular shroud, said first stator assembly comprising a first plurality of windings and a first annular stator core;

a second annular stator assembly disposed in spaced-away coaxial confronting relation to said first annular stator assembly, said second annular stator assembly comprising a second plurality of windings and a second annular stator core;

said stators being disposed in magnetomotive relation to a rotor, said rotor having a plurality of rotor blades wherein a portion of at least one of said rotor blades comprises a permanent magnet;

said plurality of rotor blades projecting radially outward from a central annular hub to an annular rotor band, said rotor being disposed in coaxial relation with said shroud between said first annular stator assembly and said second annular stator assembly so that said annular rotor band is sealingly circumscribed by said first annular stator assembly and said central annular hub is disposed in surrounding sealed relation to said second annular stator assembly with said rotor being free to rotate relative to said first and second stator assemblies;

means for connecting said electric motor means to a source of electrical power; and means for structurally supporting said electric motor means on a marine vehicle.

2. Apparatus according to claim 1 wherein said at least one rotor blade comprises a hollow propeller blade formed from a nonmagnetic material, wherein said permanent magnet is fixed within an interior portion of said hollow propeller blade.

3. Apparatus according to claim 1 wherein said source of electrical power comprises a variable frequency controller coupled to said first and said second stator assemblies whereby the frequency of power supplied to said first and said second stator assemblies can be increased gradually from zero cycles/second.

4. Apparatus according to claim 1 wherein a nonconducting fluid is disposed between said annular rotor band and said first annular stator assembly.

5. Apparatus according to claim 1 wherein a nonconducting fluid is disposed between said central annular hub and said second annular stator assembly.

6. Apparatus according to claim 1 wherein said first and said second stator assemblies are cooled by water flowing through said shroud.

7. Apparatus according to claim 1 wherein said first annular stator core is slotless.

8. Apparatus according to claim 1 wherein said second annular stator core is slotless.

9. Apparatus according to claim 1 wherein said second annular stator core comprises a plurality of slots adapted to receive said second plurality of windings.

10. Apparatus according to claim 1 wherein said first plurality of windings are positioned relative to said annular rotor band so as to cause a current running through said windings to be disposed in substantially perpendicular relation to a magnetic field created by said permanent magnets and thereby maximize the magnetomotive force exerted on said rotor blades.

11. Apparatus according to claim 1 wherein said second plurality of windings are positioned relative to said annular rotor band so as to cause a current running through said windings to be disposed in substantially perpendicular relation to a magnetic field created by said permanent magnets and thereby maximize the magnetomotive force exerted on said rotor blades.

12. A marine propulsor comprising:

electric motor means for converting electrical energy into hydropropulsive energy wherein said electric motor means comprise at least one stator disposed in magnetomotive relation to a rotor, said rotor having a plurality of rotor blades wherein a portion of at least one of said rotor blades comprises a permanent magnet and wherein said plurality of rotor blades are skewed relative to an axis of rotation of said rotor so that effective magnetic poles of said rotor blades occupy discrete sectors of said rotor;

means for connecting said electric motor means to a source of electrical power; and means for structurally supporting said electric motor means on a marine vehicle.

13. Apparatus according to claim 12 wherein each of said rotor blades comprises more than two magnetic poles.

14. A marine propulsor comprising:

electric motor means for converting electrical energy into hydropropulsive energy wherein said electric motor means comprise at least one stator disposed in magnetomotive relation to a rotor, said rotor having a plurality of rotor blades wherein a portion of at least one of said rotor blades comprises a permanent magnet;

an annular shroud comprising a water inlet end, a water outlet end, and an inner surface having an annular recess disposed adjacent to said water inlet end;

said one stator comprising an annular stator assembly disposed within said annular recess of said annular shroud, said annular stator assembly including a plurality of windings and an annular stator core;

said plurality of rotor blades projecting radially outward from a central annular hub to an annular rotor band, said rotor band disposed in coaxial relation with said shroud so that said-annular rotor band is sealingly circumscribed by said annular stator assembly and said central annular hub is disposed in surrounding sealed relation to said means for structurally supporting said electric motor means with said rotor being free to rotate;

means for connecting said electric motor means to a source of electrical power; and means for structurally supporting said electric motor means on a marine vehicle.

15. A marine propulsor comprising:

electric motor means for converting electrical energy into hydropropulsive energy wherein said electric motor means comprise at least one stator disposed in magnetomotive relation to a rotor, said rotor having a plurality of rotor blades wherein a portion of at least one of said rotor blades comprises a permanent magnet;

an annular shroud comprising a water inlet end, a water outlet end, an inner surface, said shroud being disposed in surrounding relation to a rigid support structure having an end portion centrally disposed within said water inlet end of said annular shroud and rigidly attached to said annular shroud by a plurality of support blades extending generally radially inward from said inner surface of said shroud to an outer surface of said end portion, said structure including an axial portion rigidly attached to said end portion and extending therefrom;

said one stator comprising an annular stator assembly including a plurality of windings and an annular stator core, said annular stator assembly being mounted on said axial portion; and said rotor comprising a central annular hub disposed in surrounding sealed relation to said annular stator assembly, and said plurality of rotor blades project radially outward from said central annular hub, said rotor being disposed in coaxial relation with said shroud so as to be between said annular stator assembly and said inner surface of said shroud wherein said rotor is free to rotate;

means for connecting said electric motor means to a source of electrical power; and means for structurally supporting said electric motor means on a marine vehicle.

16. A marine propulsor comprising:

an annular shroud comprising a water inlet end, a water outlet end, and an inner surface having an annular recess disposed adjacent to said water inlet end;

a first annular stator assembly disposed within said annular recess of said annular shroud, said first annular stator assembly including a first plurality of windings and a first annular stator core;

a second annular stator assembly disposed in spaced-away, coaxial confronting relation to said first annular stator assembly, said second annular stator assembly including a second plurality of windings and a second annular stator core;

a rotor comprising a plurality of permanent magnet rotor blades projecting radially outward from a central annular hub to an annular rotor band, said rotor being disposed in coaxial relation with said shroud between said first annular stator assembly and said second annular stator assembly so that said annular rotor band is sealingly circumscribed by said first annular stator assembly and said central annular hub is disposed in surrounding sealed relation to said second annular stator assembly with said rotor being free to rotate;

a rigid support structure having an end portion centrally disposed within said water inlet end of said annular shroud and rigidly attached to said annular shroud by a plurality of support blades extending generally radially inward from said inner surface of said shroud to an outer surface of said end portion, said structure also including an axial portion rigidly attached to said end portion and extending therefrom axially through said central annular hub, said second annular stator assembly being mounted to said axial portion so that said central annular hub sealingly encloses said second annular stator assembly and rotates relative to said first and said second annular stator assemblies and said axial portion; and electrical power cables connected to said first and second plurality of windings in said first and second annular stator assemblies and emanating therefrom through the interior of at least one of said support blades of said end portion and therefrom through the interior of said axial portion of said support structure to the exterior of said propulsion unit for connection to a source of electrical power.

17. A system for propelling a marine vehicle through water comprising:

a body having a generally cylindrical shape and including a tail section;

a propulsor unit mounted on said tail section of said body;

said propulsor unit comprising an annular shroud comprising a water inlet end, a water outlet end, and an inner surface having an annular recess disposed adjacent to said water inlet end;

a first annular stator assembly disposed within said annular recess of said annular shroud, said first annular stator assembly including a first plurality of windings and a first annular stator core;

a second annular stator assembly disposed in spaced-away, coaxial confronting relation to said first annular stator assembly, said second annular stator assembly including a second plurality of windings and a second annular stator core;

a rotor comprising a plurality of permanent magnet rotor blades projecting radially outward from a central annular hub to an annular rotor band, said rotor being disposed in coaxial relation with said shroud between said first annular stator assembly and said second annular stator assembly so that said annular rotor band is sealingly circumscribed by said first annular stator assembly and said central annular hub is disposed in surrounding sealed relation to said second annular stator assembly with said rotor being free to rotate;

a rigid support structure having an end portion centrally disposed within said water inlet end of said annular shroud and rigidly attached to said annular shroud by a plurality of support blades extending generally radially inward from said inner surface of said shroud to an outer surface of said end portion, said structure also including an axial portion rigidly attached to said end portion and extending therefrom axially through said central annular hub, said second annular stator assembly being mounted to said axial portion so that said central annular hub sealingly encloses said second annular stator assembly and rotates relative to said first and said second annular stator assemblies and said axial portion; and electrical power cables connected to said first and second plurality of windings in said first and second annular stator assemblies and emanating therefrom through the interior of at least one of said support blades of said end portion and therefrom through the interior of said axial portion of said support structure to the exterior of said propulsion unit for connection to a source of electrical power.

* * * * *